(12) United States Patent
Sylthe et al.

(10) Patent No.: US 7,363,582 B2
(45) Date of Patent: Apr. 22, 2008

(54) SYSTEM AND METHOD OF RETRIEVING AND PRESENTING PARTIAL (SKIPPED) DOCUMENT CONTENT

(75) Inventors: Olav Andrew Sylthe, Atlanta, GA (US); Jianwei (Oliver) Yuan, Cumming, GA (US); Dan Dumitru, Atlanta, GA (US)

(73) Assignee: Research In Motion Limited, Waterloo, Ontario (CA)

( * ) Notice: Subject to any disclaimer, the term of this patent is extended or adjusted under 35 U.S.C. 154(b) by 416 days.

(21) Appl. No.: 10/988,282

(22) Filed: Nov. 12, 2004

(65) Prior Publication Data

US 2005/0108636 A1 May 19, 2005

Related U.S. Application Data

(60) Provisional application No. 60/519,973, filed on Nov. 14, 2003.

(51) Int. Cl.
*G06F 15/00* (2006.01)

(52) U.S. Cl. ...................... 715/513; 715/517; 715/525; 715/526; 715/530

(58) Field of Classification Search ................ 715/513, 715/525, 517, 526, 530
See application file for complete search history.

(56) References Cited

U.S. PATENT DOCUMENTS 6,353,635 B1 * 3/2002 Montague et al. ..... 375/240.26

(Continued)

FOREIGN PATENT DOCUMENTS

WO    WO 01/74023    10/2001

(Continued)

OTHER PUBLICATIONS

Research in Motion Limited, "Attachment Service Installation and Getting Started Guide", Oct. 23, 2002.*

*Primary Examiner*—Doug Hutton
*Assistant Examiner*—Rachna Singh
(74) *Attorney, Agent, or Firm*—Stephen Perry; Brij K. Agarwal

(57) ABSTRACT

Systems and methods of retrieving and presenting partial (skipped) document content are provided. A typical system includes a document parsing stage, a device request for content stage and a delivery of requested content stage. A target device can include a device presentation of the requested content stage. The system parses the content of an electronic document and generates a document object model (DOM) representation of the electronic document, where each source and destination target is assigned a document object model identifier (DOM ID). In some instances, upon completion of parsing, the document object model is then paginated in computer memory into segments of a certain size called chunks; in such instances the pagination operation can update each DOM ID with an additional information attribute containing the chunk index with the purpose of establishing a relationship between a document object model identifier and the corresponding chunk index. Thus, when a device requests specific content corresponding to the DOM ID the chunk index value indicates the correct chunk to be returned to the device. The device initiates a document viewing experience by requesting, parsing and displaying an initial chunk of document content as delivered by the corresponding server. The device can, upon parsing the data chunk, record navigational information provided in the form of link information containing corresponding DOM ID and Chunk Index information. The link information can in certain instances be presented visually by a dotted underline.

18 Claims, 7 Drawing Sheets

U.S. PATENT DOCUMENTS

| | | |
|---|---|---|
| 6,556,217 B1 * | 4/2003 | Makipaa et al. .............. 345/667 |
| 6,560,640 B2 | 5/2003 | Smethers |
| 7,043,746 B2 * | 5/2006 | Ma ................................ 725/22 |
| 7,058,694 B1 * | 6/2006 | De Bonet et al. ............ 709/217 |
| 7,065,707 B2 * | 6/2006 | Chen et al. .................. 715/513 |
| 7,127,736 B2 * | 10/2006 | Kondo et al. ................... 725/93 |
| 2001/0044849 A1 | 11/2001 | Ndili et al. |
| 2002/0078149 A1 * | 6/2002 | Chang et al. ................ 709/203 |
| 2002/0161928 A1 * | 10/2002 | Ndili .......................... 709/246 |
| 2003/0004984 A1 * | 1/2003 | Chou .......................... 707/500 |
| 2003/0221014 A1 * | 11/2003 | Kosiba et al. ............... 709/231 |
| 2003/0229900 A1 * | 12/2003 | Reisman ....................... 725/87 |
| 2004/0068552 A1 * | 4/2004 | Kotz et al. .................. 709/218 |
| 2004/0221311 A1 * | 11/2004 | Dow et al. ..................... 725/52 |
| 2006/0059223 A1 * | 3/2006 | Klemets et al. .............. 709/200 |
| 2006/0136571 A1 * | 6/2006 | Kloba et al. ................. 709/217 |
| 2007/0016909 A1 * | 1/2007 | Gautier ....................... 719/310 |
| 2007/0186236 A1 * | 8/2007 | Jarman ......................... 725/28 |

FOREIGN PATENT DOCUMENTS

| | | |
|---|---|---|
| WO | WO 03/001755 | 1/2003 |

* cited by examiner

Coding Conventions.doc
4.5 Global variables 5
4.6 Methods 5
4.7 Properties 6
4.8 Constants 6
5 Miscellaneous Conventions
5.1 ANSI C++ 6
5.2 Const usage 6
5.3 Memory management 6
5.4 Parameter passing 6
5.5 Type conversions 7
5.6 STL library usage 7

FIG. 5

Coding Conventions.doc

5.5 Type conversions 7
5.6 STL library usage 7

1 Introduction

Skipped Content: 5.1 kb

Input parameters should be mostly passed as references (and constant). Output parameters should be passed as pointers. The use of input-output parameters should

FIG. 7

SYSTEM AND METHOD OF RETRIEVING AND PRESENTING PARTIAL (SKIPPED) DOCUMENT CONTENT

CROSS-REFERENCE

This application claims the benefit of U.S. Provisional Patent Application Ser. No. 60/519,973 entitled "SYSTEM AND METHOD OF RETRIEVING AND PRESENTING PARTIAL (SKIPPED) DOCUMENT CONTENT" filed Nov. 14, 2003, the disclosures of which are incorporated herein by reference.

BACKGROUND

This application relates generally to content delivery of documents, and specifically to retrieving partial document content to be displayed on a limited memory and/or bandwidth device and indicating the skipped content from the original document to the user.

Electronic documents are produced using various computer programs, such as word processors, spreadsheet programs, financial software, and presentation software. In addition to textual information, documents can contain navigational information in the form of table of content, bookmarks and hyperlinks. This navigational information allows the user of the computer programs the ability to quickly move to relevant sections of the document by clicking on a navigational link as defined by a table of content or hyperlink pointing to a bookmark. By using a navigational link the computer program will immediately reposition the content in the document to the desired section of the document and thereby eliminate the need for the user to traverse the document on a sequential page-by-page basis until the desired section of content is found.

When the user of a mobile communication device, or other limited memory and/or bandwidth device, wishes to access an electronic document which resides on a remote computer, and view the document on the mobile communication device, the entire electronic document is typically transmitted over a potentially bandwidth-constrained wireless network to the mobile communication device. For example, if a user wishes to view only the one-page terms and conditions section at page 100 of a 400-page document, the preceding 99 pages must first be transmitted to the device, which is costly and time consuming from a network limitation perspective. Yet, the user only views one page on the mobile device (i.e. page 100).

Once on the device, the electronic document is viewed using the mobile communication device's user interface, which typically differs from the user interface used to create and view the document on a personal computer. For example, while the user interface on a personal computer used to create an electronic document may include a large, color display and a pointing device such as a mouse, the mobile communication device may have a small, non-color screen, and may not have a mouse. In addition, the mobile communication device typically has greater processing power and memory limitations than a computer used to view the electronic document, which may be very large in size.

SUMMARY

Systems and methods of retrieving and presenting partial (skipped) document content are provided. A typical system includes a document parsing stage, a device request for content stage and a delivery of requested content stage. A target device can include a device presentation of the requested content stage.

The system parses the content of an electronic document and generates a document object model (DOM) representation of the electronic document. For example, where the electronic document contains navigational elements such as table of content, hyperlinks and bookmarks, the navigational information such as source and target destination is recorded in the document object model (DOM), where each source and destination target is assigned a document object model identifier (DOM ID). In some instances, upon completion of parsing, the document object model is then paginated in computer memory into segments of a certain size called chunks; in such instances the pagination operation can update each DOM ID with an additional information attribute containing the chunk index with the purpose of establishing a relationship between a document object model identifier and the corresponding chunk index. Thus, when a device requests specific content corresponding to the DOM ID the chunk index value indicates the correct chunk to be returned to the device.

A method of requesting document content from a device is also represented. In some instances, the method of requesting partial content initiated from the device can be based on navigational information represented by table of content, hyperlinks and bookmarks originating from the original document content facilitating the ability to skip content between the source and target link and thus facilitating the near desktop experience of navigating to a different part of the document without navigating through the document on a sequential page by page basis. The wireless device initiates a document viewing experience by requesting, parsing and displaying an initial chunk of document content as delivered by the corresponding server element The device side component can, upon parsing the data chunk, record navigational information provided in the form of link information containing corresponding DOM ID and Chunk Index information. The link information can in certain instances be presented visually by a dotted underline, although alternative presentations would be feasible.

Additional advantages will be set forth in part in the description which follows, and in part will be obvious from the description, or may be learned by practice. The advantages will be realized and attained by means of the elements and combinations particularly pointed out herein. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments set forth in the description.

FIG. 5 depicts an exemplary navigation screen displayed on the viewing device created via a server side document analysis and pagination.

FIG. 7 is an example screen showing a portion of document navigated to via the navigational screen with an indication as to content skipped through the navigational process.

DETAILED DESCRIPTION

Figure 1:
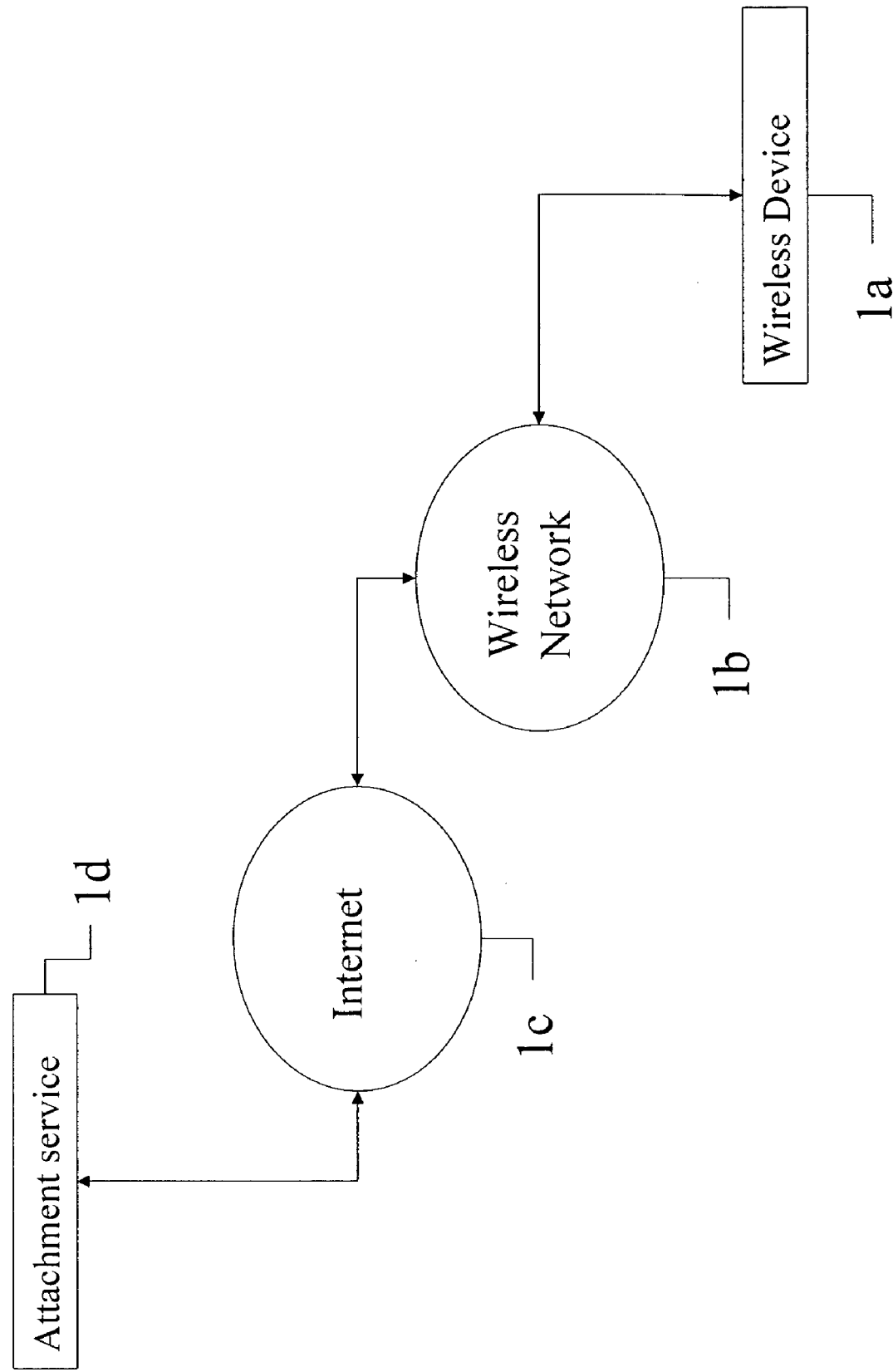
FIG. 1 is a diagram depicting a typical transmission path for a document conversion request.

Various examples are now described in detail. Referring to the drawings, like numbers indicate like parts throughout the views. As used in the description herein, the meaning of "a," "an," and "the" includes plural reference unless the context clearly dictates otherwise. Also, as used in the description herein, the meaning of "in" includes "in" and "on" unless the context clearly dictates otherwise. Finally, as used in the description herein, the meanings of "and" and "or" include both the conjunctive and disjunctive and may be used interchangeably unless the context clearly dictates otherwise.

The foregoing description makes reference to a specific type of document for distribution to a potential low bandwidth and/or memory constrained device, namely an e-mail attachment. The present application however is not so limited; rather, the disclosed systems and methods can be applied to any type of distribution not simply attachments to e-mails.

Email attachments typically are in the form of documents created in word processing, spreadsheets, or presentation applications. Some of these document types such as word processing, presentations and also web pages support navigational features such as table of content, hyperlinks and bookmarks. The purpose of navigational features such as these is to allow the user of an application to quickly navigate between different parts or sections of a document. This is useful from a user perspective as such documents typically can consist of large amounts of textual content resulting in a document span several hundred pages or more. Using navigational features such as table of content, hyperlinks and bookmarks dispenses with the requirement to manually navigate the document by traversing it page-by-page until a desired section of the document is located. A simple click on a hyperlink or table of content entry will reposition the application content display to the desired section, thus eliminating manual page-by-page navigation or scrolling through the document.

Furthermore, a table of content entry or hyperlink consists of what is known as source definition and a target destination. The latter is typically known as a bookmark. These definitions exists as detectable entities in the original source document that the originating source application utilizes for navigational purposes. As an example, if a user wishes to see terms and conditions on page 400 of 450 in a legal document then clicking on the "Terms and Conditions" entry in the table of content or the equivalent hyperlink will immediately position the user at page 400 when viewing the document in the originating source application.

Many types of computing devices have transmission bandwidth and/or memory constraints. The foregoing description uses a wireless device an example of such a device; other examples include, without limitation, pocket computers, PDAs, mobile phones, etc It should be understood that reference to wireless devices in the foregoing does not limit the applicability of the disclosed systems and methods with respect to other constrained devices.

Wireless devices today are limited compared to desktop computers when it comes to aspects such as display real estate, processing power (CPU), storage, available power supply (battery) and network capability in the form of available bandwidth for transfer of data.

Referring to the "Terms and Conditions" example presented above, in a wireless device scenario, retrieval of the content of the preceding 399 pages of the original document would be required over today's limited network bandwidth. This would also consume a large amount of the limited storage on the device itself, making this a slow and costly operation.

Wireless devices today are severely limited compared to desktop computers when it comes to aspects such as display real estate, processing power (CPU), storage, available power supply (battery) and network capability in the form of available bandwidth for transfer of data.

The implementation of systems and methods to retrieve partial (skipped) content based on the navigational capabilities of the original documents such as table of content, hyperlinks and bookmarks is highly desirable for a user on a wireless device. Retrieving only the desired content for reading or viewing on the device by recognizing these navigational entities in the document and presenting them accordingly on the wireless device saves time and preserves bandwidth and local storage.

Retrieving and viewing of partial (skipped) content on a wireless device can be accomplished through the use of two (2) elements. A client application in the form of document viewer, such as an attachment viewer (AV), and a server application in the form of document server, such as an Attachment Server (AS), that through a series of interactive steps present the user with the navigational capabilities on a wireless device, having capability similar in scope to those found in the original document authoring environment.

On the document server, the server converts the document for distribution. This conversion can be the result of a client request or can occur automatically upon receipt of the document for distribution. A portion of the converted document is distributed to the document viewer client, where the converted document contains navigational points interpretable by the document viewer client. Upon activation of such a navigational point, the server receives a request for a further portion of the converted document and distributes the further portion to the requesting client.

On the client side, the client can in some instances request initial conversion of the document for distribution; for example, FIG. 1 depicts a user of a wireless device (1*a*) using the document viewer client application to send a request to view a document attachment in an email, over the wireless network (1*b*) through the internet (1*c*) using the appropriate protocol to the document server (1*d*). Alternatively, the document can be available in converted form at the point of initial request. In either case, a portion of the converted document is received and displayed on the wireless device via the document viewer client. The document viewer client receives input information from the user of the client. Based upon the received input the document viewer client requests one or more appropriate further portions of the converted documents. Upon receipt of such a portion, the document viewer client displays the received further portion for further user interaction.

Figure 2:
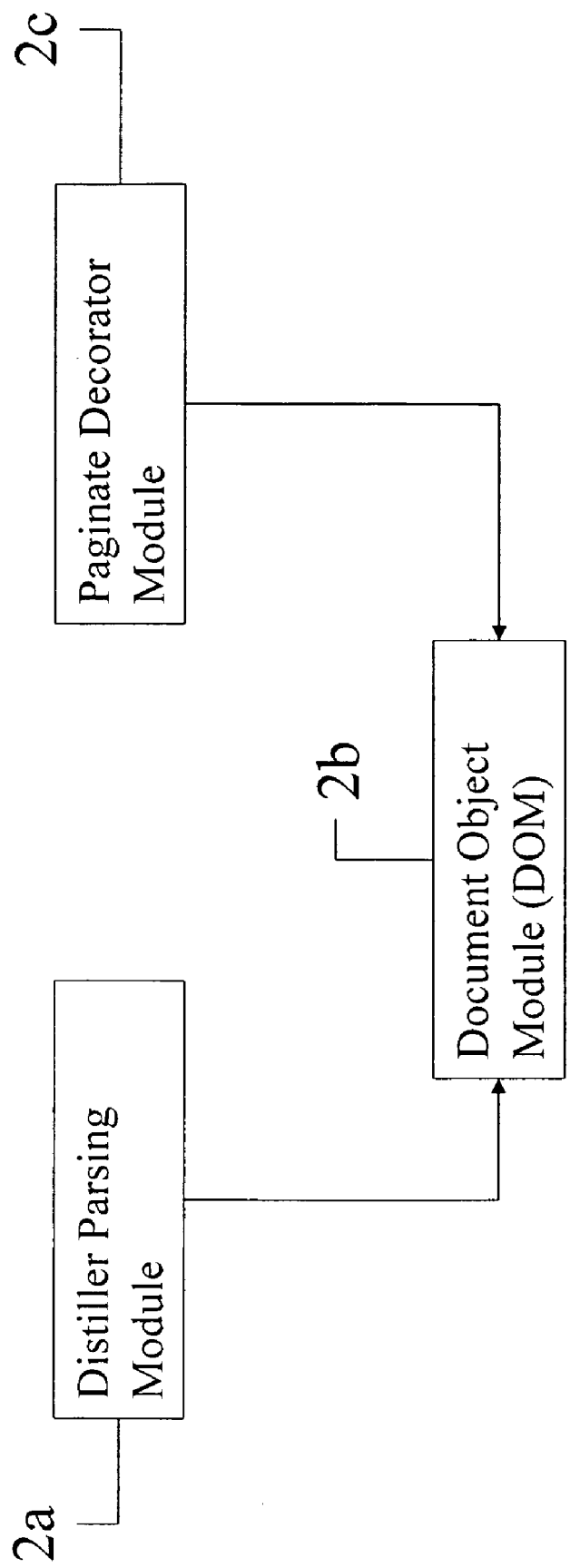
FIG. 2 is a block diagram of architectural components in a typical server side document analysis and pagination system.
Figure 4:
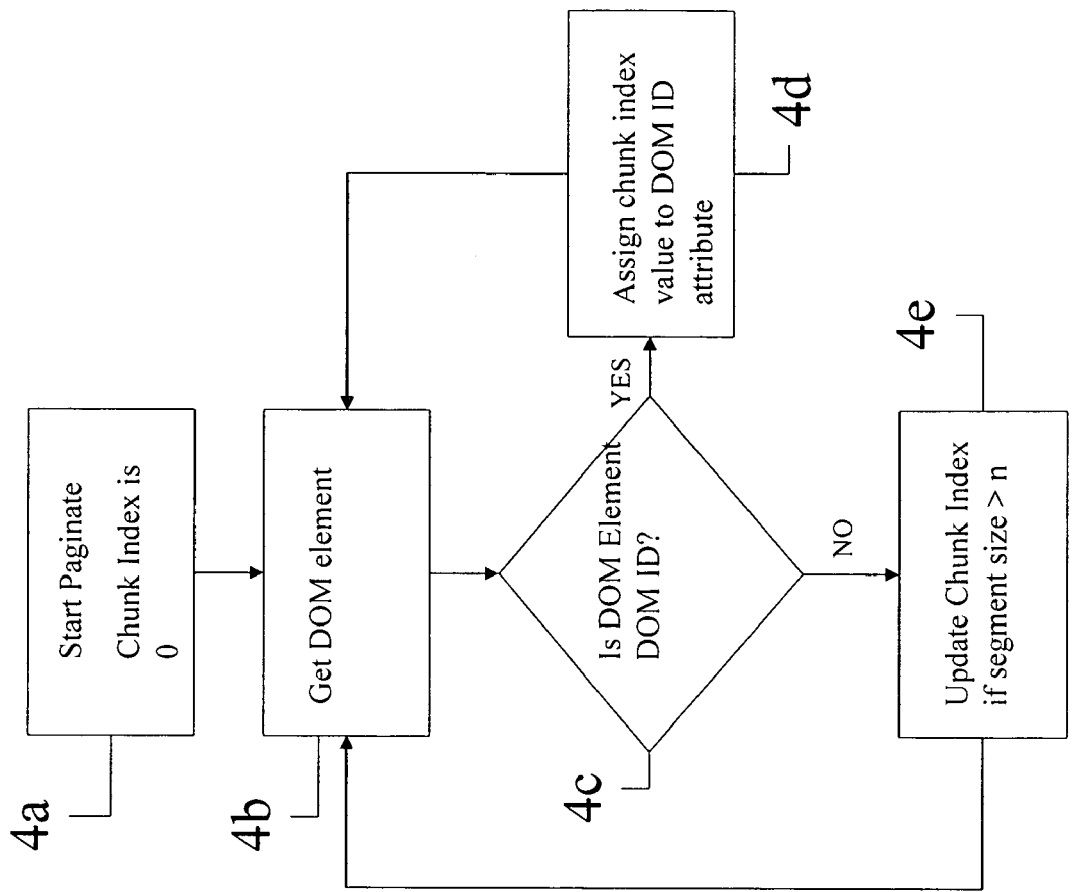
FIG. 4 is a flow chart depicting a pagination process.
Figure 3:
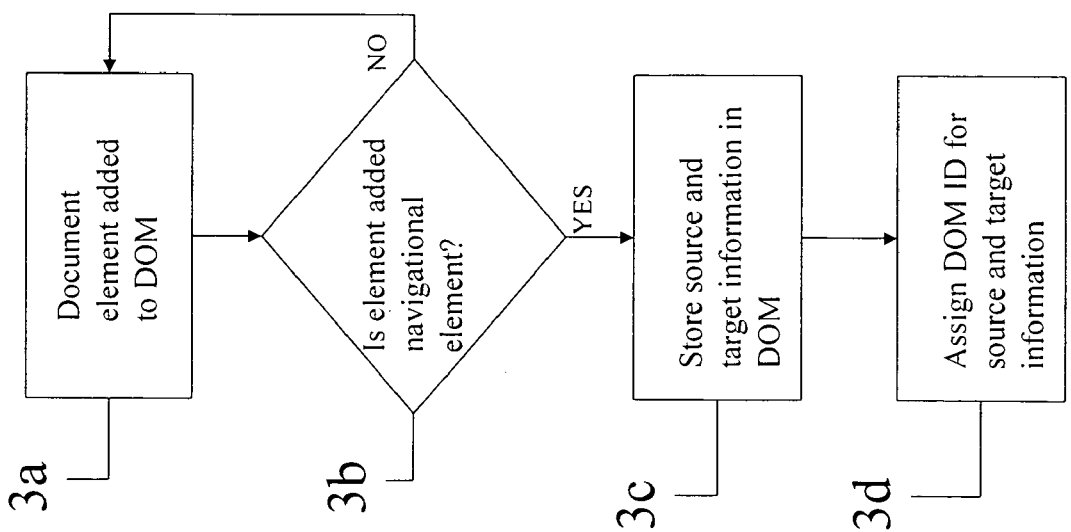
FIG. 3 is a flow chart depicting a document navigational points identification process.

As discussed above, the server receives a request from the client for conversion of the original document such as an attachment in an email message. Alternatively, the server begins conversion upon receipt of the document for distribution. FIG. 2 depicts a block diagram of conversion architectural components used in an exemplary server. FIG. 3 and FIG. 4 depict exemplary processes to accomplish various tasks in the conversion. The server parses through the document using a document distiller module (2a) and extracts defined informational entities from the file such as textual paragraphs, font type, font size, font styles, table of content, bookmarks, and hyperlinks etc. and populates a document object model (DOM) module (2b) in memory by adding valid document entities (3a). The parsing may include a binary examination of the document. This process may be assisted by reference to specific parsing rules according to a type associated with the given document. Of these informational entities; table of content, hyperlinks and bookmarks are recognized as navigational entities. When navigational entities are detected (3b) additional information such as source and target destination is recorded (3c) in the document object model (DOM) where each source and destination target is assigned a document object model identifier (DOM ID)(3d).

Upon completion of parsing the original document, the DOM can then be paginated in a subsequent step with a pagination decorator module (2c) in computer memory into segments of a certain size called chunks. The pagination can occur at the time of conversion. Or, in instances where parsing occurs automatically upon receipt of the document, pagination may be deferred until a request for the document is received; in such cases, the pagination can be made dependant upon a characteristic of the request such as target device, requesting client application, etc.

The pagination starts with a chunk index value of 0 (4a). The pagination operation traverses the DOM by getting each DOM element (4b) and if the DOM element is a navigational DOM ID (4C) it updates the DOM ID with an additional information attribute containing the chunk index (4D) with the purpose of establishing a relationship between a document object model identifier and the corresponding chunk index. This pagination operation that traverses the DOM element increases the chunk index count every time the segment size exceeded n bytes (4e).

Thus, when the device requests specific content corresponding to the DOM ID the chunk index value indicates the correct chunk to be returned to the device. The chunk index represents a pointer to the position in the DOM where the target content of a navigational link resides for this method. Consequently, this represents an exemplary approach to managing pointer based retrieval of document chunks; alternative addressing approaches such as using other forms of unique descriptors or byte count offsets could be used.

Upon completion of pagination by the server, the server generates output data according to a suitable transmission protocol for delivery to the target device. Such output data can, for example, be in a binary form to be returned over the wireless network to the device. One such possible output data format is UCS (Universal Content Stream) which is device agnostic and thus can be understood by wireless clients on different handheld devices. The UCS data is segmented into pieces of n bytes each such as n=3000 and one such segment is retuned per client request. The UCS is created by the server invoking a process that starts with the root node of the DOM and traverses through the DOM elements one by one and recording the DOM element content into equivalent UCS commands that allows the original content to be repurposed by the client while preserving essential document characteristics such as font size, font styles, paragraphs, table of content, hyperlinks and bookmarks.

When the client requests a converted document from the server, the client enters into a pending state until the server returns a response. In the scenario of a successful conversion the client is notified to this effect with a status code and the first chunk of the converted document (e.g., n bytes of binary UCS data). The client then parses the data and executes any command recorded therein to repurpose the original document content in the client display area. The client presents textual content using font characteristics such as font styles and paragraphs, and also display navigational entities such as table of content, hyperlinks and bookmarks in an equivalent form to the original application. Navigational entities are typically present as links, which are displayed by the client in a suitable form such as link text underlined by a dotted underline such as "This is a link", or a similar distinct indication (FIG. 5), and can in some instances furthermore provide additional usability guidance by highlighting links while the user navigates by moving the client cursor through the presented content. The received chunk contains the matching DOM ID and chunk index associated with each such presented navigational entity.

Figure 6:
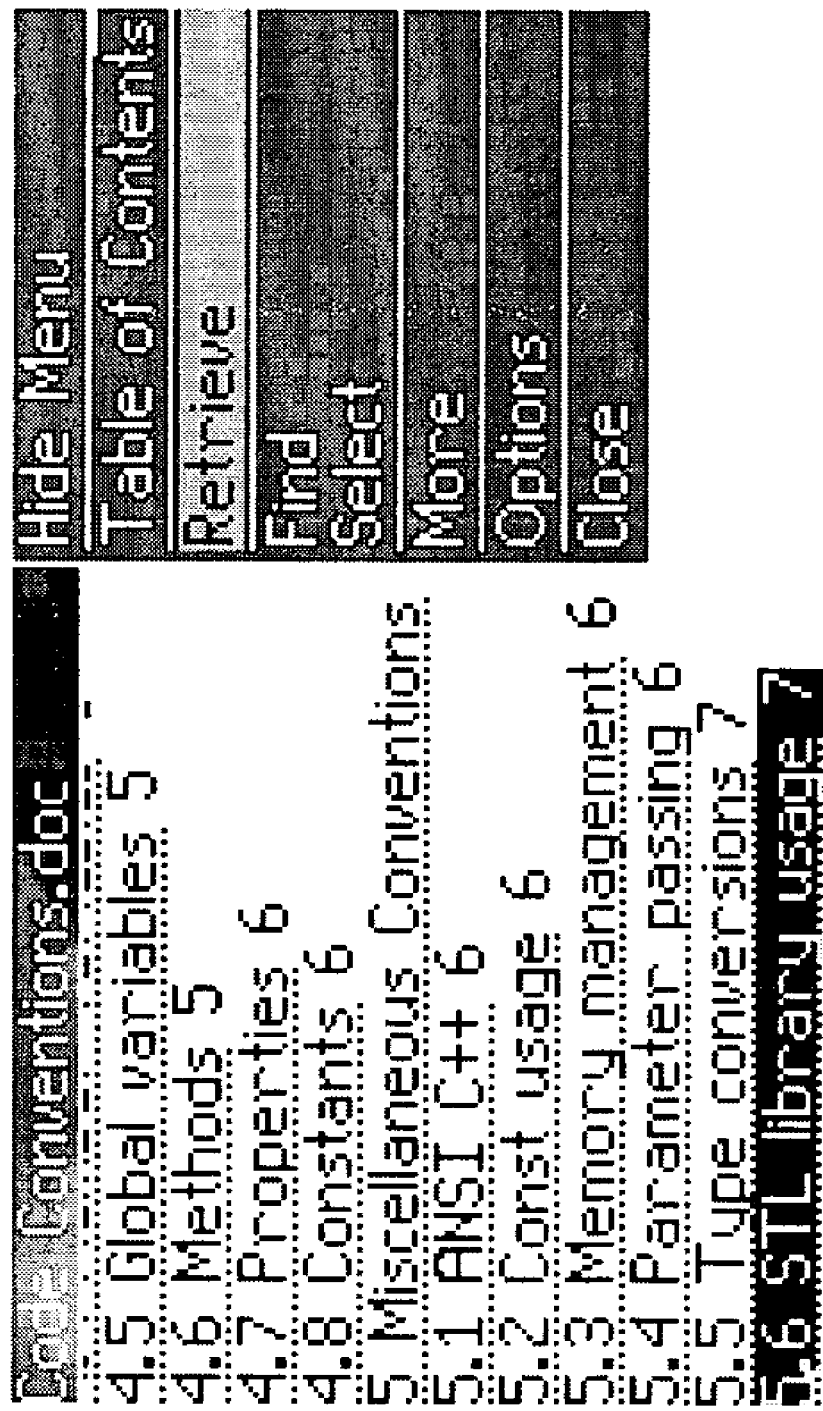
FIG. 6 depicts an example interface for navigating via the navigational screen of FIG. 5.

A navigational link encountered in the client may be invoked such as by selecting the command "Retrieve" (FIG. 6) from the client menu. The client then sends a request to the server using the appropriate communication protocol and passes information about the link source and destination characteristics (e.g. the DOM ID and chunk index are sent to the server asking for content from the DOM at the target destination).

When the server receives a request for content from the client, the command sent by the client passes information associated with a navigational link in the form of DOM ID and chunk index, as discussed above. The server uses the chunk index to locate the appropriate position in the DOM in memory where the target content of the navigational link points.

The second step to complete the request received from the client is to persist the content from the pointed position in the DOM into output data (e.g., the binary UCS format in the size of n bytes). The chunk is then returned over the wireless network to the requesting client.

The client receives the new chunk over the wireless network and parses through the commands therein. The client detects that this is the response to its preceding client request through the chunk index information encountered by parsing the output data byte stream. The client then determined whether there is skipped content between what already resides on the device by looking at the chunk index information on the device and the recently received chunk index. If a gap is detected (e.g. a scenario such as chunk index 1 is on the device and a navigational link was invoked for chunk index 10) then there is skipped content remaining on the server (i.e. from chunk index 2-9).

To allow for a visual indication to the user of the client application, the display of the client application is then updated to reflect the skipped content by inserting a horizontal bar between the content displayed for chunk index 1 and the content displayed for chunk index 10 and labeling the horizontal bar with the text "Skipped Content" and the size of the skipped content remaining at the server, in kilobytes (FIG. 7).

If the client application issues multiple navigational link requests, upon receipt of the server response for the requests multiple horizontal "skipped content" bars are inserted where appropriate if there are gaps in the chunk index data on the device.

Figure 8:
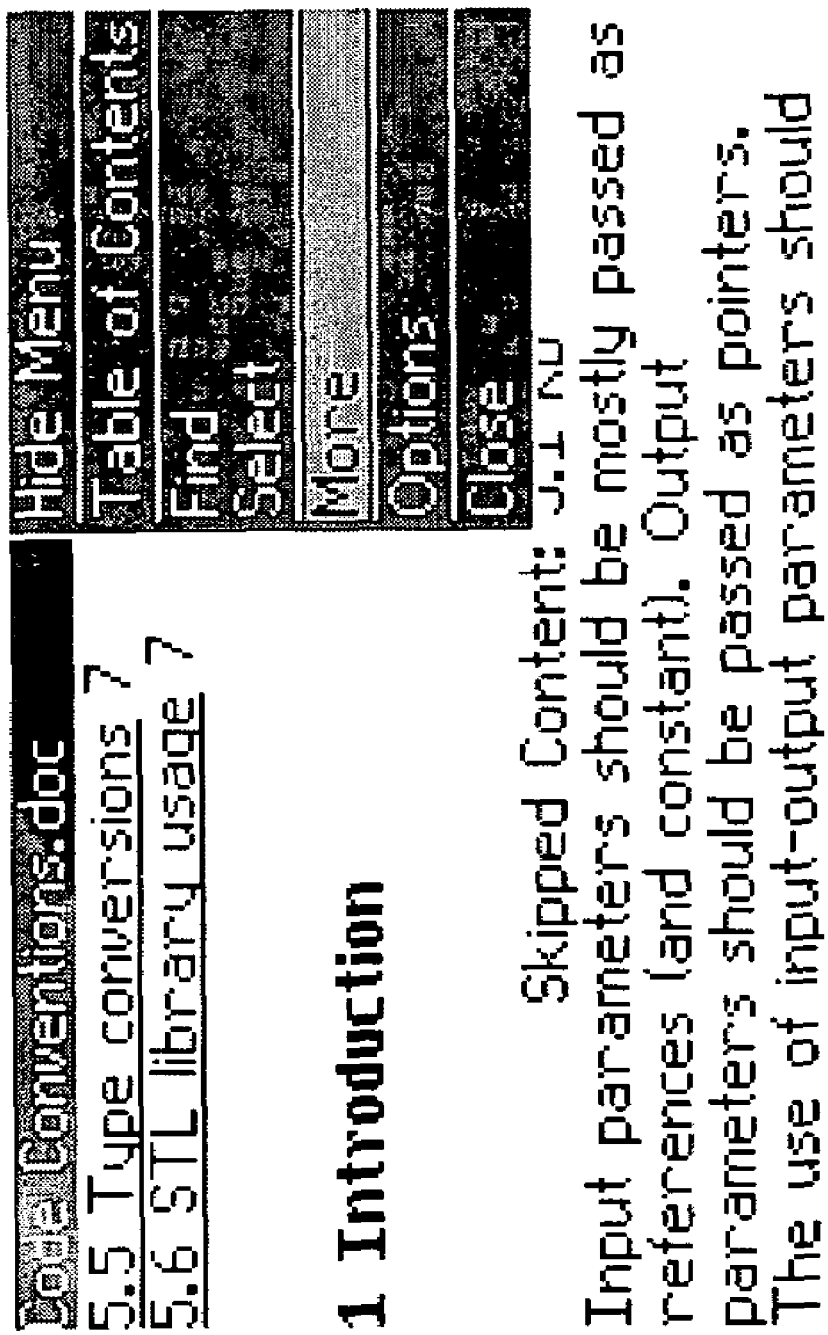
FIG. 8 is an example screen depicting further navigation from the example seen in FIG. 7.

Furthermore, the horizontal inserted "Skipped Content" bar indicator serves the purpose as acting as a selectable client control to allow invocation of the client command "more". The "More" command allows the client application to request the succeeding chunk index from the server. This means if the client application invokes "more" (FIG. 8) from the skipped content bar control inserted between chunks 1 and 10 on the device, a request for chunk index 2 is sent to the server. Upon receipt of the data chunk the client display is updated with the inserted new content and the "skipped content" bar is also updated to reflect the decrease in Kilobytes of the remaining skipped content back at the server.

The various systems and methods described above are given as illustrative examples only. It will be readily appreciated by those skilled in the art that many deviations may be made from the specific systems and methods disclosed in this application.

What is claimed is:

1. A process for retrieving and viewing partial content of a server stored document on a mobile communication device, comprising;

extracting informational entities from said document within said server;

populating a model of said document within said server with elements corresponding to said informational entities;

detecting navigational entities within said informational entities and in response storing within said server source and target destinations associated with said navigational entities;

assigning an identifier to each of said source and target destinations within said model;

paginating said model within said server into a plurality of segments identified by respective index values, including updating each said identifier with an attribute containing a corresponding one of said index values;

generating output data for delivery to said mobile communication device by traversing through said elements in said model and recording each element as an equivalent command containing content and document characteristics;

sending a first request from the mobile communication device to the server to display said document;

in response to receiving said first request transmitting a first segment of said output data from said server to said mobile communication device;

parsing said output data within said mobile communication device and executing each said equivalent command to thereby display said content of said first segment of the document according to said document characteristics including any of said navigational entities contained within said first seament;

in response to user selection of a navigational entity displayed on said mobile communication device sending a further request to said server containing the identifier and index value corresponding to said navigational entity;

in response to receiving said further request transmitting a further segment of said output data from said server to said mobile communication device from a location in said model corresponding to said index;

parsing said further segment of output data within said mobile communication device and executing each said equivalent command to thereby display said content of said further segment of the document according to said document characteristics;

detecting within said mobile communication device any skipped content between said first and further segment and providing a visual indication of said skipped content on said mobile communication device, wherein said visual indication of said skipped content includes a horizontal bar indicator between said first and further segment displayed on said mobile communication device; and calculating and displaying size of said skipped content within said horizontal bar indicator.

2. The process of claim 1, wherein said extracting further includes parsing said document using a document distiller.

3. The process of claim 1, wherein each of said informational entities includes at least one of textual paragraphs, font type, font size, font style, table of contents, bookmarks, and hyperlinks.

4. The process of claim 1, wherein each of said navigation entities includes at least one of a table of content, hyperlinks, and bookmarks.

5. The process of claim 1, wherein said paginating is performed by said server upon receipt of said first request.

6. The process of claim 1, wherein said output data is in Universal Content Stream format.

7. The process of claim 1, wherein said horizontal bar indicator is a selectable client control to allow invocation of an additional request for the server to transmit an additional segment of said output data subsequent to said first segment for display on said mobile communication device.

8. The process of claim 1, wherein said parsing further includes binary examination of said document.

9. The process of claim 8, wherein said binary examination further includes executing specific parsing rules according to a type associated with said document.

10. The process of claim 1, wherein said navigational entities are displayed on said mobile communication device as underlined link text.

11. The process of claim 10, wherein said underlined link text is a selectable client control to allow invocation of said further request.

12. A mobile communication device process comprising;

sending a first request to display a document;

receiving and parsing output data corresponding to a first segment of said document, said output data including commands containing content and document characteristics;

parsing said output data and executing each of said commands to thereby display the content of said first segment of the document according to said document characteristics including any navigational entities contained within said first segment;

in response to user selection of a navigational entity sending a further request containing an identifier and index value corresponding to said navigational entity;

receiving and parsing a further segment of output data corresponding to a further segment of said document;

parsing said further segment of output data and executing each command therein to thereby display the content of said further segment of the document according to said document characteristics; and detecting within said mobile communication device any skipped content between said first and further segment and providing a visual indication of said skipped content, wherein said visual indication of said skipped content includes a horizontal bar indicator between said first and further segment; and further including calculating and displaying size of said skipped content within said horizontal bar indicator.

13. The mobile communication device process of claim 12, wherein said document characteristics include at least one of textual paragraphs, font type, font size, font style, table of contents, bookmarks, and hyperlinks.

14. The mobile communication device process of claim 12, wherein each of said navigation entities includes at least one of a table of content, hyperlinks, and bookmarks.

15. The mobile communication device process of claim 12, wherein said output data is in Universal Content Stream format.

16. The process of claim 12, wherein said horizontal bar indicator is a selectable client control to allow invocation of an additional request to display an additional segment of said output data subsequent to said first segment.

17. The mobile communication device process of claim 12, wherein said navigational entities are displayed as underlined link text.

18. The mobile communication device process of claim 17, wherein said underlined link text is a selectable client control to allow invocation of said further request.

* * * * *

UNITED STATES PATENT AND TRADEMARK OFFICE
CERTIFICATE OF CORRECTION

| | |
|---|---|
| PATENT NO. | : 7,363,582 B2 |
| APPLICATION NO. | : 10/988282 |
| DATED | : April 22, 2008 |
| INVENTOR(S) | : Olav Andrew Sylthe et al. |

It is certified that error appears in the above-identified patent and that said Letters Patent is hereby corrected as shown below:

Column 2, line 35, "element" should be --element.--.
Column 5, line 59, "retuned" should be --returned--.
Column 7, line 53, "seament" should be --segment--.

Signed and Sealed this

Twenty-fourth Day of March, 2009

JOHN DOLL
*Acting Director of the United States Patent and Trademark Office*